United States Patent
Frenz et al.

(10) Patent No.: US 10,802,469 B2
(45) Date of Patent: Oct. 13, 2020

(54) GEO-FENCING WITH DIAGNOSTIC FEATURE

(71) Applicant: Ademco Inc., Golden Valley, MN (US)

(72) Inventors: Jonathan P. Frenz, Minneapolis, MN (US); Kevin L. Weirich, Plymouth, MN (US)

(73) Assignee: Ademco Inc., Golden Valley, MN (US)

( * ) Notice: Subject to any disclaimer, the term of this patent is extended or adjusted under 35 U.S.C. 154(b) by 220 days.

(21) Appl. No.: 14/933,948

(22) Filed: Nov. 5, 2015

(65) Prior Publication Data

US 2016/0313750 A1 Oct. 27, 2016

Related U.S. Application Data

(63) Continuation-in-part of application No. 14/696,662, filed on Apr. 27, 2015, now Pat. No. 9,609,478.

(51) Int. Cl.
| | |
|---|---|
| *G05B 19/41* | (2006.01) |
| *G05B 19/4155* | (2006.01) |
| *H04W 4/021* | (2018.01) |
| *H04L 12/28* | (2006.01) |

(52) U.S. Cl.
CPC .......... *G05B 19/4155* (2013.01); *H04L 12/28* (2013.01); *H04W 4/021* (2013.01); *G05B 2219/2614* (2013.01)

(58) Field of Classification Search
CPC .... H04W 4/021; H04L 12/28; G05B 19/4155; H04N 2201/0094; H04N 2201/0087
See application file for complete search history.

(56) References Cited

U.S. PATENT DOCUMENTS

| | | |
|---|---|---|
| 6,255,988 B1 | 7/2001 | Bischoff |
| 6,356,282 B2 | 3/2002 | Roytman et al. |
| 6,400,956 B1 | 6/2002 | Richton |
| 6,478,233 B1 | 11/2002 | Shah |

(Continued)

FOREIGN PATENT DOCUMENTS

| | | |
|---|---|---|
| AU | 2015201441 A1 | 10/2015 |
| CN | 101689327 | 5/2013 |

(Continued)

OTHER PUBLICATIONS

U.S. Appl. No. 15/048,902, filed Feb. 19, 2016.

(Continued)

*Primary Examiner* — Santosh R Poudel
(74) *Attorney, Agent, or Firm* — Shumaker & Sieffert, P.A.

(57) ABSTRACT

A building automation server may include a memory that is configured to store a log of geo-fence crossing events including one or more parameters associated with a mobile device. A communications module may be configured to communicate with the mobile device and to receive the one or more parameters associated with the mobile device. A controller may be configured to process the log to diagnose the geo-fencing functionality and, in some cases, to identify one or more corrective actions. In some cases, the controller may be configured to provide the one or more corrective actions to the communications module for output to an external device. In some cases, an external device such as a mobile device may be configured to display messages pertaining to the one or more corrective actions.

17 Claims, 9 Drawing Sheets

| Email | Trigger | Device Token | Phone Timestamp | Phone Direction | Server 1 Timestamp | Server 1 Received | Server 1 Direction | Server 1 ->Server 2 | Server 2 -> STAT |
|---|---|---|---|---|---|---|---|---|---|
| JohnDoe@yahoo.com | FenceCrossed | 1bdb72ba4b | 8/30/2015 9:47:22 PM | Depart | 8/30/2015 9:47:22 PM | 8/30/2015 9:46:23 PM | Depart | ✓ | ✓ |
| JohnSmith@gmail.com | FenceCrossed | 1bdb78ba4c | 8/30/2015 9:46:21 PM | Arrive | 8/30/2015 9:46:21 PM | 8/30/2015 9:45:27 PM | Arrive | ✓ | ✓ |
| FredSmith@gmail.com | FenceCrossed | 1bdb81ba6a | 8/30/2015 9:35:51 PM | Depart | 8/30/2015 9:35:51 PM | 8/30/2015 9:34:46 PM | Depart | ✓ | X |
| JulieJones@gmail.com | FenceCrossed | 1bdb91ba4x | 8/30/2015 9:25:51 PM | Arrive | 8/30/2015 9:25:51 PM | 8/30/2015 9:24:48 PM | Arrive | ✓ | ✓ |
| BillSmith@gmail.com | FenceCrossed | 1bdb72ca3c | 8/30/2015 9:20:23 PM | Depart | 8/30/2015 9:20:23 PM | 8/30/2015 9:19:19 PM | Depart | ✓ | X |
| JoeJohns@gmail.com | FenceCrossed | 1bdb72aa4d | 8/30/2015 9:19:12 PM | Arrive | 8/30/2015 9:19:12 PM | 8/30/2015 9:18:07 PM | Arrive | ✓ | ✓ |

(56) References Cited

U.S. PATENT DOCUMENTS

| | | |
|---|---|---|
| 6,529,137 B1 | 3/2003 | Roe |
| 6,604,023 B1 | 8/2003 | Brown et al. |
| 6,665,613 B2 | 12/2003 | Duvall |
| 6,909,891 B2 | 6/2005 | Yamashita et al. |
| 6,990,335 B1 | 1/2006 | Shamoon et al. |
| 7,083,109 B2 | 8/2006 | Pouchak |
| 7,127,734 B1 | 10/2006 | Amit |
| 7,130,719 B2 | 10/2006 | Ehlers et al. |
| 7,155,305 B2 | 12/2006 | Hayes et al. |
| D535,573 S | 1/2007 | Barton et al. |
| 7,159,789 B2 | 1/2007 | Schwendinger et al. |
| 7,257,397 B2 | 8/2007 | Shamoon et al. |
| 7,327,250 B2 | 2/2008 | Harvey |
| 7,385,500 B2 | 6/2008 | Irwin |
| D580,801 S | 11/2008 | Takach et al. |
| 7,451,017 B2 | 11/2008 | McNally |
| 7,510,126 B2 | 3/2009 | Rossi et al. |
| 7,571,865 B2 | 8/2009 | Nicodem et al. |
| 7,614,567 B2 | 11/2009 | Chapman et al. |
| 7,636,604 B2 | 12/2009 | Bergman et al. |
| 7,668,532 B2 | 2/2010 | Shamoon et al. |
| 7,768,393 B2 | 8/2010 | Nigam |
| 7,801,646 B2 | 9/2010 | Amundson et al. |
| 7,812,274 B2 | 10/2010 | Dupont et al. |
| 7,839,275 B2 | 11/2010 | Spalink et al. |
| 7,908,211 B1 | 3/2011 | Chen et al. |
| 7,949,615 B2 | 5/2011 | Ehlers et al. |
| 7,953,518 B2 | 5/2011 | Kansal et al. |
| 7,973,678 B2 | 7/2011 | Petricoin, Jr. et al. |
| 8,018,329 B2 | 9/2011 | Morgan et al. |
| 8,064,935 B2 | 11/2011 | Shamoon et al. |
| 8,065,342 B1 | 11/2011 | Borg et al. |
| 8,095,340 B2 | 1/2012 | Brown |
| 8,115,656 B2 | 2/2012 | Bevacqua et al. |
| 8,125,332 B2 | 2/2012 | Curran et al. |
| 8,180,492 B2 | 5/2012 | Steinberg |
| 8,195,313 B1 | 6/2012 | Fadell et al. |
| 8,205,244 B2 | 6/2012 | Nightingale et al. |
| 8,232,877 B2 | 7/2012 | Husain |
| 8,249,582 B1 * | 8/2012 | Abou-El-Ella ..... H04L 41/5054 455/412.2 |
| 8,255,090 B2 | 8/2012 | Frader-Thompson et al. |
| 8,269,620 B2 | 9/2012 | Bullemer et al. |
| 8,280,536 B1 | 10/2012 | Fadell et al. |
| 8,301,765 B2 | 10/2012 | Goodman |
| 8,332,055 B2 | 12/2012 | Veillette |
| 8,350,697 B2 | 1/2013 | Trundle et al. |
| 8,386,082 B2 | 2/2013 | Oswald |
| 8,390,473 B2 | 3/2013 | Kryzanowski et al. |
| 8,412,381 B2 | 4/2013 | Nikovski et al. |
| 8,412,654 B2 | 4/2013 | Montalvo |
| 8,428,867 B2 | 4/2013 | Ashley, Jr. et al. |
| 8,433,344 B1 | 4/2013 | Virga |
| 8,442,695 B2 | 5/2013 | Imes et al. |
| 8,457,797 B2 | 6/2013 | Imes et al. |
| 8,509,954 B2 | 8/2013 | Imes et al. |
| 8,531,294 B2 | 9/2013 | Slavin et al. |
| 8,554,374 B2 | 10/2013 | Lunacek et al. |
| 8,554,714 B2 | 10/2013 | Raymond et al. |
| 8,560,127 B2 | 10/2013 | Leen et al. |
| 8,571,518 B2 | 10/2013 | Imes et al. |
| 8,587,445 B2 | 11/2013 | Rockwell |
| 8,620,841 B1 | 12/2013 | Filson et al. |
| 8,626,344 B2 | 1/2014 | Imes et al. |
| 8,630,741 B1 | 1/2014 | Matsuoka et al. |
| 8,644,813 B1 | 2/2014 | Gailloux et al. |
| 8,648,706 B2 | 2/2014 | Ranjun et al. |
| 8,670,783 B2 | 3/2014 | Klein |
| 8,686,841 B2 | 4/2014 | Macheca et al. |
| 8,718,826 B2 | 5/2014 | Ramachandran et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,840,033 B2 | 9/2014 | Steinberg |
| 8,874,129 B2 | 10/2014 | Forutanpour et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,965,401 B2 | 2/2015 | Sheshadri et al. |
| 8,965,406 B2 | 2/2015 | Henderson |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,066,316 B2 | 6/2015 | Secades et al. |
| 9,071,453 B2 | 6/2015 | Shoemaker et al. |
| 9,075,716 B2 | 7/2015 | Dempski et al. |
| 9,113,298 B2 | 8/2015 | Qiu |
| 9,137,664 B2 | 9/2015 | Fok et al. |
| 9,167,381 B2 | 10/2015 | McDonald et al. |
| 9,168,927 B2 | 10/2015 | Louboutin |
| 9,183,530 B2 | 11/2015 | Schwarz et al. |
| 9,210,545 B2 | 12/2015 | Sabatelli et al. |
| 9,215,560 B1 | 12/2015 | Jernigan |
| 9,219,983 B2 | 12/2015 | Sheshadri et al. |
| 9,225,623 B2 | 12/2015 | Sokolik et al. |
| 9,247,378 B2 | 1/2016 | Bisson et al. |
| 9,280,559 B1 | 3/2016 | Jones |
| 9,288,620 B2 | 3/2016 | Menendez |
| 9,363,638 B1 | 3/2016 | Jones |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,363,772 B2 | 6/2016 | Burks |
| 9,396,344 B1 | 7/2016 | Jones |
| 9,414,422 B2 | 8/2016 | Belghoul et al. |
| 9,433,681 B2 | 9/2016 | Constien et al. |
| 9,449,491 B2 | 9/2016 | Sager et al. |
| 9,491,577 B1 | 11/2016 | Jones |
| 9,589,435 B2 | 3/2017 | Finlow-Bates |
| 9,635,500 B1 | 4/2017 | Becker et al. |
| 9,645,589 B2 | 5/2017 | Leen et al. |
| 9,714,771 B1 * | 7/2017 | Goodman ............ F24F 11/0009 |
| 9,826,357 B2 | 11/2017 | Frenz et al. |
| 9,980,089 B2 * | 5/2018 | Liang ..................... H04W 4/12 |
| 2002/0147006 A1 | 10/2002 | Coon et al. |
| 2005/0172056 A1 | 8/2005 | Ahn |
| 2006/0063522 A1 | 3/2006 | McFarland |
| 2006/0097063 A1 | 5/2006 | Zeevi |
| 2006/0192673 A1 | 8/2006 | Irwin |
| 2007/0037605 A1 | 2/2007 | Logan |
| 2007/0099626 A1 | 5/2007 | Lawrence et al. |
| 2007/0114295 A1 | 5/2007 | Jenkins |
| 2007/0249319 A1 | 10/2007 | Faulkner et al. |
| 2008/0094230 A1 | 4/2008 | Mock et al. |
| 2009/0325565 A1 * | 12/2009 | Backholm ......... H04M 3/42178 455/419 |
| 2010/0034386 A1 | 2/2010 | Choong et al. |
| 2010/0042940 A1 | 2/2010 | Monday et al. |
| 2010/0081375 A1 | 4/2010 | Rosenblatt et al. |
| 2010/0127854 A1 | 5/2010 | Helvick et al. |
| 2010/0156628 A1 | 6/2010 | Ainsbury et al. |
| 2010/0257224 A1 * | 10/2010 | Tobita ...................... G06F 8/61 709/202 |
| 2010/0261465 A1 | 10/2010 | Rhoads et al. |
| 2011/0153525 A1 | 6/2011 | Benco et al. |
| 2011/0306304 A1 * | 12/2011 | Forutanpour ....... G06F 3/04883 455/67.11 |
| 2012/0036498 A1 * | 2/2012 | Akirekadu .......... G06F 11/3495 717/124 |
| 2012/0129553 A1 * | 5/2012 | Phillips .............. G08B 21/0236 455/456.3 |
| 2012/0139760 A1 * | 6/2012 | Bevacqua ............. B60R 25/102 340/989 |
| 2012/0172027 A1 | 7/2012 | Partheesh et al. |
| 2012/0191257 A1 | 7/2012 | Corcoran et al. |
| 2012/0209730 A1 | 8/2012 | Garrett |
| 2012/0259466 A1 | 10/2012 | Ray et al. |
| 2012/0284769 A1 | 11/2012 | Dixon et al. |
| 2013/0031047 A1 * | 1/2013 | Boazi ..................... G01S 19/34 707/609 |
| 2013/0045753 A1 | 2/2013 | Obermeyer et al. |

(56) References Cited

U.S. PATENT DOCUMENTS

| | | |
|---|---|---|
| 2013/0073094 A1 | 3/2013 | Knapton et al. |
| 2013/0099977 A1 | 4/2013 | Sheshadri et al. |
| 2013/0204441 A1 | 8/2013 | Sloo et al. |
| 2013/0225196 A1 | 8/2013 | James et al. |
| 2013/0231137 A1 | 9/2013 | Hugie et al. |
| 2013/0267253 A1* | 10/2013 | Case ............ H04W 4/021 455/456.3 |
| 2013/0310053 A1 | 11/2013 | Srivastava et al. |
| 2013/0318217 A1 | 11/2013 | Imes et al. |
| 2013/0331087 A1 | 12/2013 | Shoemaker et al. |
| 2014/0031989 A1 | 1/2014 | Bergman et al. |
| 2014/0031991 A1 | 1/2014 | Bergman et al. |
| 2014/0100835 A1 | 4/2014 | Majumdar et al. |
| 2014/0155092 A1* | 6/2014 | Ben-Dayan ...... G08B 21/0261 455/456.2 |
| 2014/0156087 A1 | 6/2014 | Amundson |
| 2014/0164118 A1 | 6/2014 | Polachi |
| 2014/0172176 A1 | 6/2014 | Deilmann et al. |
| 2014/0192737 A1 | 7/2014 | Belghoul et al. |
| 2014/0200718 A1 | 7/2014 | Tessier |
| 2014/0244048 A1 | 8/2014 | Ramachandran et al. |
| 2014/0266635 A1 | 9/2014 | Roth et al. |
| 2014/0277762 A1 | 9/2014 | Drew |
| 2014/0279123 A1 | 9/2014 | Harkey et al. |
| 2014/0302879 A1 | 10/2014 | Kim et al. |
| 2014/0330435 A1 | 11/2014 | Stoner et al. |
| 2014/0337123 A1 | 11/2014 | Neurenberg et al. |
| 2014/0349672 A1 | 11/2014 | Kern et al. |
| 2014/0364103 A1* | 12/2014 | Marti ............ H04W 4/029 455/418 |
| 2014/0370911 A1 | 12/2014 | Gorgenyi et al. |
| 2015/0065161 A1 | 3/2015 | Ganesh et al. |
| 2015/0094860 A1 | 4/2015 | Finnerty et al. |
| 2015/0112885 A1* | 4/2015 | Fadell ............ G08B 27/00 705/330 |
| 2015/0140994 A1 | 5/2015 | Partheesh et al. |
| 2015/0141037 A1* | 5/2015 | Saha ............ H04W 4/021 455/456.1 |
| 2015/0141045 A1 | 5/2015 | Qiu et al. |
| 2015/0159895 A1 | 6/2015 | Quam et al. |
| 2015/0163631 A1 | 6/2015 | Quam et al. |
| 2015/0163945 A1 | 6/2015 | Barton et al. |
| 2015/0186497 A1 | 7/2015 | Patton et al. |
| 2015/0237193 A1 | 8/2015 | Zeilingold et al. |
| 2015/0237465 A1* | 8/2015 | Akgul ............ H04W 36/32 455/456.1 |
| 2015/0237470 A1 | 8/2015 | Mayor et al. |
| 2015/0237475 A1* | 8/2015 | Henson ............ H04W 4/021 455/456.3 |
| 2015/0271638 A1 | 9/2015 | Menayas et al. |
| 2015/0281889 A1 | 10/2015 | Menendez |
| 2015/0301543 A1 | 10/2015 | Janoso et al. |
| 2015/0338116 A1 | 11/2015 | Furuta et al. |
| 2015/0370272 A1 | 12/2015 | Reddy et al. |
| 2015/0372832 A1 | 12/2015 | Kortz et al. |
| 2016/0007156 A1 | 1/2016 | Chiou et al. |
| 2016/0012451 A1 | 1/2016 | Shanmugam et al. |
| 2016/0018832 A1* | 1/2016 | Frank ............ F24F 11/006 700/276 |
| 2016/0054865 A1 | 2/2016 | Kerr et al. |
| 2016/0057572 A1 | 2/2016 | Bojorquez et al. |
| 2016/0142872 A1 | 5/2016 | Nicholson et al. |
| 2016/0171540 A1* | 6/2016 | Mangipudi ........ G06Q 30/0255 705/14.53 |
| 2016/0180345 A1* | 6/2016 | Canpolat ............ G06Q 30/00 705/26.1 |
| 2016/0223998 A1 | 8/2016 | Songkakul et al. |
| 2017/0026506 A1 | 1/2017 | Haepp et al. |

FOREIGN PATENT DOCUMENTS

| | | |
|---|---|---|
| CN | 104704863 A | 6/2015 |
| CN | 105318499 A | 2/2016 |
| DE | 102013226390 A1 | 6/2015 |
| EP | 1515289 | 3/2005 |
| EP | 2607802 | 6/2013 |
| EP | 2675195 A2 | 12/2013 |
| EP | 3001116 A1 | 3/2016 |
| JP | 2011203841 A | 10/2011 |
| JP | 2012109680 A | 6/2012 |
| MX | 2012000906 | 9/2012 |
| WO | 2006055334 A1 | 5/2006 |
| WO | WO 2009/034720 | 3/2009 |
| WO | WO 2009/036764 | 3/2009 |
| WO | WO 2009/067251 | 5/2009 |
| WO | WO 2011/011404 | 1/2011 |
| WO | 2011121299 A1 | 10/2011 |
| WO | WO 2012/000107 | 1/2012 |
| WO | 2012068517 A1 | 5/2012 |
| WO | WO 2013/118142 | 8/2013 |
| WO | WO 2013/170791 | 11/2013 |
| WO | WO 2014/016705 | 1/2014 |
| WO | WO 2014/047501 | 3/2014 |
| WO | 2014055939 A1 | 4/2014 |
| WO | WO 2014/144323 | 9/2014 |
| WO | 2014200524 A2 | 12/2014 |
| WO | WO 2014/197320 | 12/2014 |
| WO | 2015047739 A1 | 4/2015 |
| WO | 2015089116 A1 | 6/2015 |
| WO | 2015164400 A1 | 10/2015 |

OTHER PUBLICATIONS

The Extended European Search Report and Opinion for EP Application No. 16156760.7-1862, dated Jul. 8, 2016.

The Extended European Search Report for EP Application No. 1619416, dated Feb. 2, 2017.

The Extended European Search Report for EP Application No. 16196128.9, dated Mar. 7, 2017.

Gentec, "Feature Focus, Threat Level Management," 2 pages, 2013.

Allure Energy, "Our Technology," http://www.allure-energy.com/pages/about.jsp 1 page, printed May 30, 2012.

The Extended European Search Report for EP Application No. 16195639.6, dated May 31, 2017.

The International Search Report for PCT Application No. PCT/US2010/042589 dated Nov. 22, 2010.

Mozer, "The Neural Network House: An Environment that Adapts to Its Inhabitants," Department of Computer Science, University of Colorado, 5 pages, downloaded May 29, 2012.

Balaji et al., "Sentinel: Occupancy Based HVAC Actuation Using Existing WiFi Infrastructure Within Commercial Buildings," SenSys '13, 14 pages, Nov. 11-15, 2015.

Do, "Programmable Communicating Thermostats for Demand Response in California," DR ETD Workshop, 26 pages, Jun. 11, 2007.

Green, "PM's Thermostat Guide," Popular Mechanics, pp. 155-158, Oct. 1985.

Gupta et al., "Adding GPS-Control to Traditional Thermostats: An Exploration of Potential Energy Savings and Design Challenges," Pervasive, LNCS 5538, pp. 95-114, 2009.

Gupta, "A Persuasive GPS-Controlled Thermostat System," 89 pages, Sep. 2008.

http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.

http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.

http://www.allure-energy.com/aenf_jan9_12.html, "CES Gets First Look at EverSense," Allure Energy, 2 pages, printed Feb. 17, 2015.

http:/IWww.prnev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.

Mobile Integrated Solutions, LLC, "MobiLinc Take Control of Your Home, MobiLinc and Geo-Fence Awareness," 9 pages, downloaded Mar. 27, 2015.

(56) References Cited

OTHER PUBLICATIONS

Pan et al., "A Framework for Smart Location-Based Automated Energy Controls in a Green Building Testbed," 6 pages, downloaded Jan. 30, 2015.
SmartThings Inc., "2 Ecobee Si Thermostat + Geofencing," 17 pages, downloaded Nov. 3, 2014.
U.S. Appl. No. 14/640,984, filed Mar. 6, 2015.
U.S. Appl. No. 14/668,800, filed Mar. 25, 2015.
U.S. Appl. No. 14/696,725, filed Apr. 27, 2015.
U.S. Appl. No. 14/696,662, filed Apr. 27, 2015.
U.S. Appl. No. 14/934,543, filed Nov. 6, 2015.
U.S. Appl. No. 14/938,595, filed Nov. 11, 2015.
U.S. Appl. No. 14/938,642, filed Nov. 11, 2015.
U.S. Appl. No. 14/964,264, filed Dec. 9, 2015.
U.S. Appl. No. 14/964,349, filed Dec. 9, 2015.
Scanlon et al., "Mutual Information Based Visual Feature Selection for Lipreading," 8th International Conference on Spoken Language Processing, 5 pages, Oct. 4-8, 2004.
Transportation Research Board of the National Academies, "Commuting in America III, the Third National Report on Commuting Patterns and Trends," 199 pages, 2006.
"Petition for Inter Partes Review of U.S. Pat. No. 8,571,518 Pursuant to 35 U.S.C. 311-319,37 CFR 42," Inventor Imes et al., dated Oct. 29, 2014.
Prosecution History from U.S. Appl. No. 14/696,662, dated Aug. 3, 2016 through Nov. 17, 2016, 26 pp.

\* cited by examiner

Statistics:

| 8-15-15 – 8-29-15 | All | VIP |
|---|---|---|
| # Of Users | 85,000 | 30 |
| # Of Locations | 50,000 | 20 |
| # Of Registered Thermostats | 55,000 | 25 |
| Registered Thermostats Offline | 30.00% | 40.00% |
| Locations with Improper Geofence Shortcuts | 65.00% | 45.00% |
| Locations With Hold On | 5.00% | 10.00% |
| Users With Multiple Geofence Phones | 5.00% | 7.00% |
| Phone -> Server 1 fail for iOS | 10.00% | 5.00 |
| Phone -> Server 1 fail for Android | 5.00% | N/A |
| Server 1 -> Server 2 fail | 0.05% | 0.00% |
| Server 2 -> Stat fail | 15.00% | 10.00% |

FIG. 7

| Name | Location | Thermostat | MacId | Status | Firmware Version | Power | Phone App OS | Phone App Version | Hold Status | Shortcut Setup Status | Last Geofence Event Time | Multiple Phones |
|---|---|---|---|---|---|---|---|---|---|---|---|---|
| John Doe | home | Great House | 01-23-45-67-89-ab | online | 01.02.09.00 | C-Wire | iOS | 1.1.5 | On | Both | 8/16/15 2:27 AM | False |
| Jane Smith | home | Great House | 01-33-45-66-88-cd | online | 01.02.09.00 | C-Wire | iOS | 1.1.5 | On | Both | 8/28/15 12:10 PM | True |

FIG. 8

| Email | Trigger | Device Token | Phone Timestamp | Phone Direction | Server 1 Timestamp | Server 1 Received | Server 1 Direction | Server 1 ->Server 2 | Server 2 -> STAT |
|---|---|---|---|---|---|---|---|---|---|
| JohnDoe@yahoo.com | FenceCrossed | 1bdb72ba4b | 8/30/2015 9:47:22 PM | Depart | 8/30/2015 9:47:22 PM | 8/30/2015 9:46:23 PM | Depart | ✓ | ✓ |
| JohnSmith@gmail.com | FenceCrossed | 1bdb78ba4c | 8/30/2015 9:46:21 PM | Arrive | 8/30/2015 9:46:21 PM | 8/30/2015 9:45:27 PM | Arrive | ✓ | ✓ |
| FredSmith@gmail.com | FenceCrossed | 1bdb81ba6a | 8/30/2015 9:35:51 PM | Depart | 8/30/2015 9:35:51 PM | 8/30/2015 9:34:46 PM | Depart | ✓ | ✗ |
| JulieJones@gmail.com | FenceCrossed | 1bdb91ba4x | 8/30/2015 9:25:51 PM | Arrive | 8/30/2015 9:25:51 PM | 8/30/2015 9:24:48 PM | Arrive | ✓ | ✓ |
| BillSmith@gmail.com | FenceCrossed | 1bdb72ca3c | 8/30/2015 9:20:23 PM | Depart | 8/30/2015 9:20:23 PM | 8/30/2015 9:19:19 PM | Depart | ✓ | ✗ |
| JoeJohns@gmail.com | FenceCrossed | 1bdb72aa4d | 8/30/2015 9:19:12 PM | Arrive | 8/30/2015 9:19:12 PM | 8/30/2015 9:18:07 PM | Arrive | ✓ | ✓ |

FIG. 9

GEO-FENCING WITH DIAGNOSTIC FEATURE

This is a continuation-in-part of co-pending U.S. patent application Ser. No. 14/696,662, filed Apr. 27, 2015 and entitled, "GEO-FENCING WITH DIAGNOSTIC FEATURE", which is incorporated herein by reference.

TECHNICAL FIELD

The disclosure relates generally to building automation and more particularly to building automation systems with geo-fencing capabilities.

BACKGROUND

Building automation systems are often used to control safety, security and/or comfort levels within a building or other structure. Illustrative but non-limiting examples of building automation systems include Heating, Ventilation and/or Air Conditioning (HVAC) systems, security systems, lighting systems, fire suppression systems and/or the like. In some cases, a building automation system may enter an unoccupied mode when the building is expected to be unoccupied and an occupied mode when the building is expected to be occupied. For example, when the building automation system includes an HVAC system, the building automation system may set a temperature set point of the HVAC system to a more energy efficient setting when in an unoccupied mode and a more comfortable setting when in an occupied mode. In another example, when the building automation system includes a security system, the building automation system may set the security system to a locked or away state when in an unoccupied mode and an unlocked or home state when in an occupied mode. Geo-fencing may be used to inform the building automation system as to whether the building is occupied or not occupied.

SUMMARY

The present disclosure pertains generally to geo-fencing, and more particularly to building automation systems with geo-fencing capabilities. An example of the disclosure may be found in a building automation server that is configured as part of a building automation system for servicing a building. A user of the building may have a mobile device with location services. The mobile device and/or building automation server may store a geo-fence associated with the building and providing a geo-fencing functionality including identifying when the mobile device crosses the geo-fence, resulting in corresponding geo-fence crossing events, and taking corresponding actions. The building automation server may include a memory that is configured to store a log of the geo-fence crossing events. For each geo-fence crossing event, the log may include an indication of the geo-fence crossing event and one or more parameters associated with the mobile device. A communications module may be configured to communicate with the mobile device and receive the one or more parameters associated with the mobile device. A controller may be operably coupled to the memory and the communications module and may be configured to process the log to help diagnose the geo-fencing functionality and, if appropriate, to identify one or more corrective actions. In some cases, the controller may be configured to provide the one or more corrective actions to the communications module for output to an external device. In some cases, the external device may be a mobile device that is configured to display messages pertaining to the one or more corrective actions. In some cases, the external device may be tablet computer, laptop computer, a desktop computer and/or any other suitable external device. In some cases, the messages may be formatted for display in a web browser.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIGS. 6 through 9 provide examples of processed information that may be outputted from a building automation system.

Figure 1:
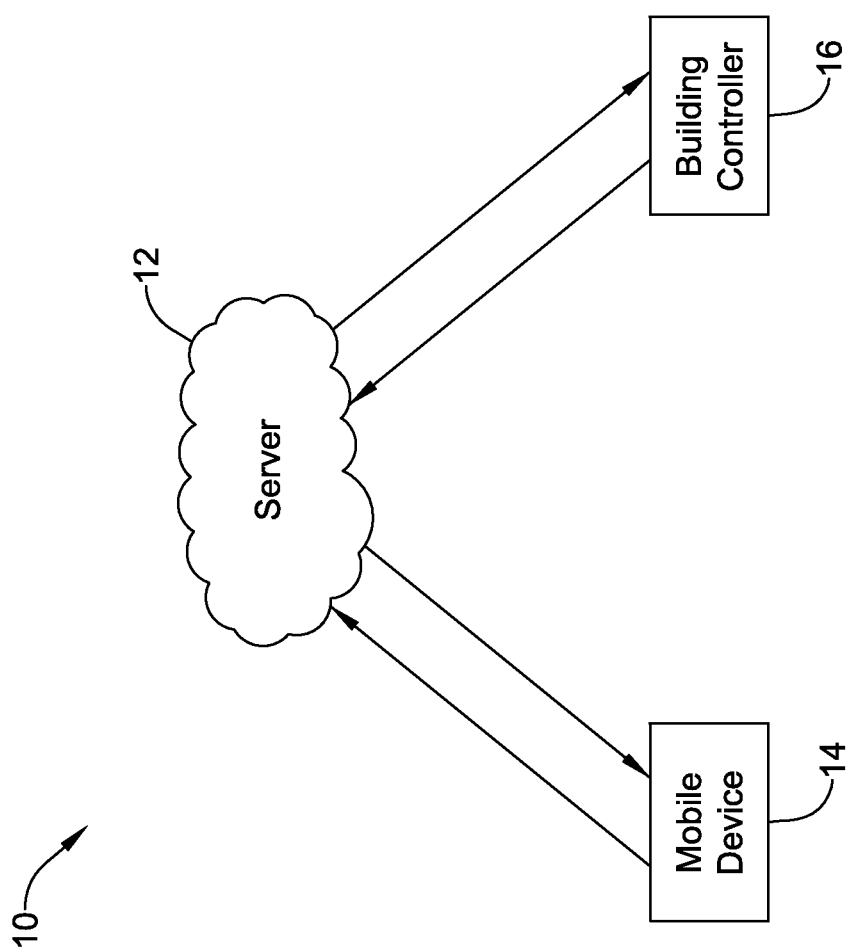
FIG. 1 is a schematic view of an illustrative building automation system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and/or any other suitable systems. While HVAC systems are used as an example below, it should be recognized that the concepts disclosed herein can be applied to building control systems more generally.

A building automation system may include a controller, computer and/or other processing equipment that is configured to control one or more features, functions, systems or sub-systems of a building. In some cases, devices that can be used by individuals to communicate with the controller, computer and/or other processing equipment. In some cases, a building automation system may include a plurality of components that, in combination, perform or otherwise provide the functionality of the building automation system. A building automation system may be fully contained within a single building, or may include components that are spread between multiple housings and/or across multiple locations. In some embodiments, a building automation system, regardless of the physical location(s) of the components within the building automation system, may control one or more building systems within a single building. In some cases, a building automation system, regardless of the physical location(s) of the components within the building automation system, may control one or more building systems within a plurality of buildings, optionally in accordance with a common operating procedure and/or distinct operating procedures for each building as desired.

FIG. 1 is a schematic view of an illustrative building automation system 10. The illustrative building automation system 10 includes a server 12 that may be configured to communicate with a mobile device 14 and with a building controller 16. It will be appreciated that for simplicity, only a single mobile device 14 is shown, while in many cases the server 12 may be configured to communicate directly or indirectly with any number of mobile devices 14. Similarly, while a single building controller 16 is illustrated, in many cases the server 12 may be configured to communicate directly or indirectly with any number of building controllers 16, located in a single building or distributed throughout a plurality of buildings. The server 12 is illustrated as a single, cloud-based server. In some cases, the server 12 may be a single server. In some instances, the server 12 may generically represent two, three or more servers commonly located or spread between two or more physical locations. In some cases, the server 12 handles communication with both the mobile device 14 and the building controller 16. In some instances, as shown for example in FIG. 2, distinct servers may carry out each communications protocol if desired.

In some cases, the mobile devices 14 may communicate with the server 12 at least partially through a network such as the Internet, sometimes using a cell phone network, WiFi network and/or any other suitable network. Likewise, it is contemplated that the building controller 16 may communicate with the server 12 at least partially through a network such as the Internet, sometimes using a cell phone network, WiFi network and/or any other suitable network.

Figure 2:
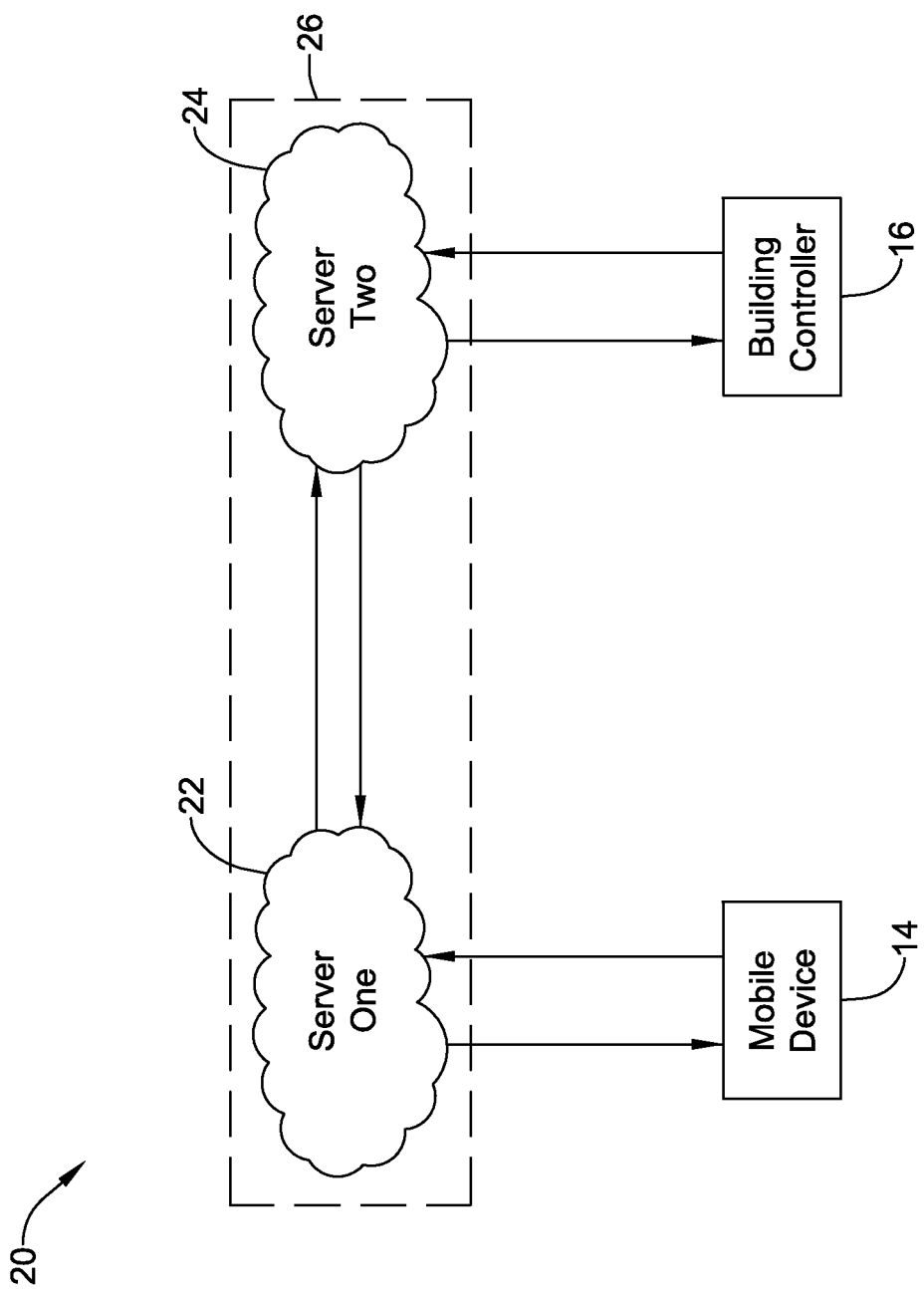
FIG. 2 is a schematic view of another illustrative building automation system.

FIG. 2 is a schematic illustration of another illustrative building automation system 20. The illustrative building automation system 20 includes a first server 22 that may be configured to communicate with a mobile device 14 (or multiple mobile devices 14) and a second server 24 that may be configured to communicate with a building controller 16 (or multiple building controllers 16). The first server 22 may be configured to receive data from the mobile device 14, process the data, and send data to the mobile device 14 and/or to the second server 24. The second server 24 may be configured to receive data from the building controller 16, process the data, and send data to the building controller 16 and/or to the first server 22. In some instances, the first server 22 may be configured to permit data from the mobile device 14 to pass directly through to the building controller 16. In some cases, the second server 24 may be configured to permit data from the building controller 16 to pass directly through to the mobile device 14. The first server 22 and the second server 24 may be configured to communicate with each other. In some cases, each of the first server 22 and the second server 24 may perform a defined function.

It will be appreciated that for simplicity, only a single mobile device 14 is shown, while in many cases the first server 22 may be configured to communicate directly or indirectly with any number of mobile devices 14. Similarly, while a single building controller 16 is illustrated, in many cases the second server 24 may be configured to communicate directly or indirectly with any number of building controllers 16, located in a single building or distributed throughout a plurality of buildings.

The first server 22 is illustrated as a single, cloud-based server. In some cases, the first server 22 may be a single server. In some instances, the first server 22 may generically represent two, three or more servers commonly located or spread between two or more physical locations. The second server 24 is illustrated as a single, cloud-based server. In some cases, the second server 24 may be a single server. In some instances, the second server 24 may generically represent two, three or more servers commonly located or spread between two or more physical locations. In some cases, the first server 22 and the second server 24 may, in combination, be considered as representing or forming a building automation server 26.

Figure 3:
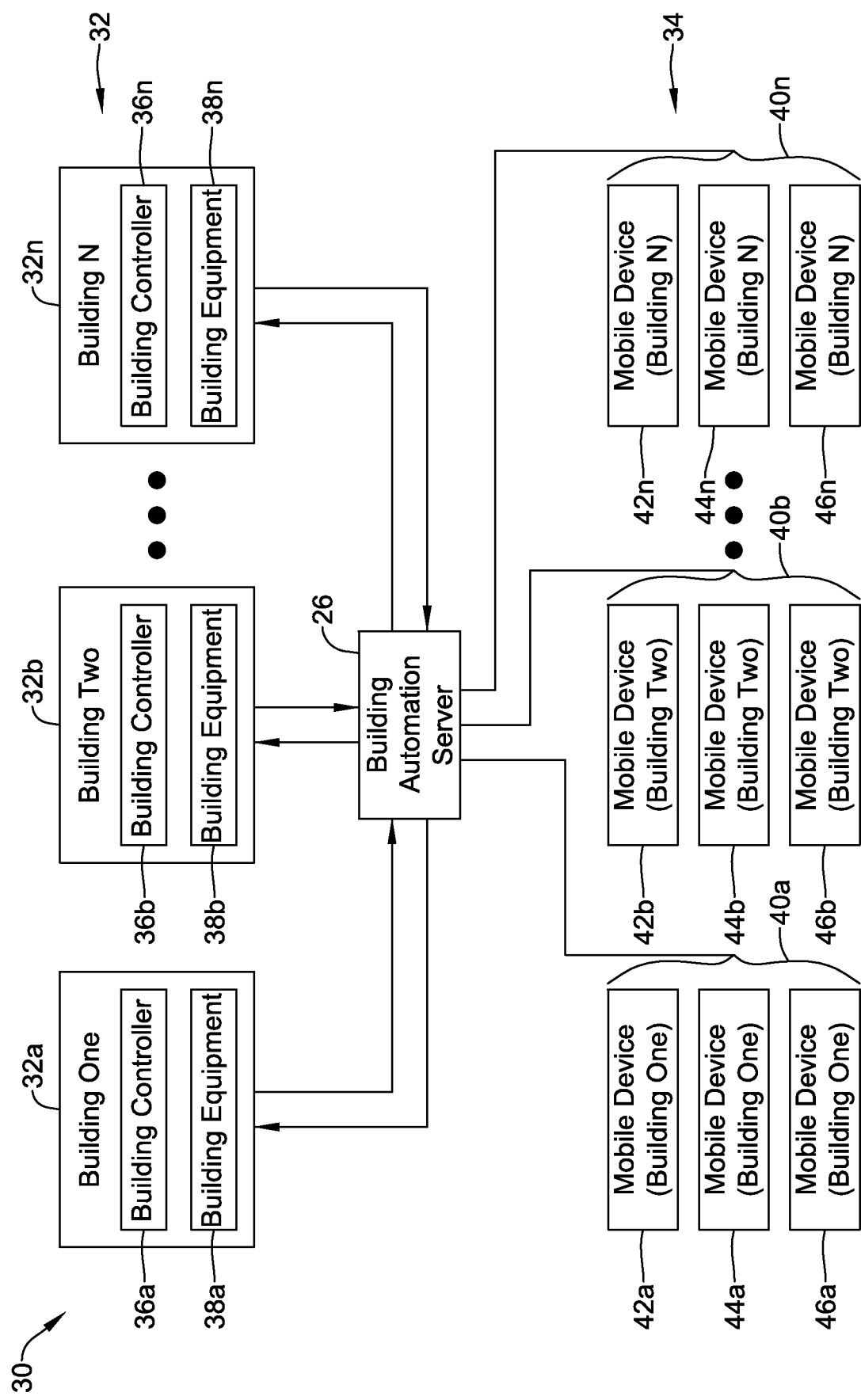
FIG. 3 is a schematic view of another illustrative building automation system.

FIG. 3 is a schematic illustration of a building automation system 30 in which a building automation server 26 is configured to communicate with a plurality of buildings 32 as well as a plurality of mobile devices 34. It is contemplated that the building automation server 26 may include a single server or two or more distinct servers at one or several locations. The building automation system 30 may serve any desired number of buildings. As illustrated, the plurality of buildings 32 includes a Building One, labeled as 32A, a Building Two, labeled as 32B, and so on through a Building "N", labeled as 32N. It will be appreciated that the building automation system 30 may include a large number of buildings, each in communication with a central (or distributed) building automation server 26. In some cases, each building may be associated with a unique customer account, as further described below.

As illustrated, each of the plurality of buildings 32 includes a building controller and one or more pieces of building equipment. The building equipment may, for example, be HVAC equipment, security equipment, lighting equipment, fire suppression equipment, and/or the like.

In particular, the building 32A includes a building controller 36A and building equipment 38A, the building 32B includes a building controller 36B and building equipment 38B, and so on through the building 32N, which includes a building controller 36N and building equipment 38N. It will be appreciated that while each building is illustrated as having a single building controller and single building equipment controlled by the single building controller, in some cases a building may have multiple related or unrelated building controllers and/or multiple pieces of related or unrelated building equipment.

The plurality of mobile devices 34 may be considered as being divided into a set of mobile devices each associated with a corresponding building. In the example shown, the plurality of mobile devices 34 may be considered as being divided into a set of mobile devices 40A that are associated with the building 32A, a set of mobile devices 40B that are associated with the building 32B, and so on through a set of mobile devices 40N that are associated with the building 32N. As illustrated, the set of mobile devices 40A includes a first mobile device 42A, a second mobile device 44A and a third mobile device 46A. The set of mobile devices 40B includes a first mobile device 42B, a second mobile device 44B and a third mobile device 46B and so on through the set of mobile devices 40N, which includes a first mobile device 42N, a second mobile device 44N and a third mobile device 46N. This is merely illustrative, as any number of mobile devices such as smartphones or tablets, may be associated with a particular building, as desired. Each user or occupant of a building may have an associated mobile device, or may have several associated mobile devices. In some cases, a user or occupant may have a mobile device associated with several different locations such as a home, a cabin or a place of work.

Associating a mobile device with a particular building generally involves the individual who uses the particular mobile device. In the example shown in FIG. 3, a mobile device can communicate with the building automation server 26, and may cause the building automation server 26 to provide instructions to the building controller that is associated with the particular mobile device. For example, and in some instances, a mobile phone with location services activated can be used to inform the building automation server 26 as to the whereabouts of the user relative to a geo-fence defined for the associated building, and in some cases an estimate of how long before the user will arrive at the associated building. The building automation server 26 may send a command to the building controller of the associated building to operate the building equipment in an energy savings manner when all of the users that are associated with a particular building are determined to be away from the building (e.g. the building is unoccupied). The building automation server 26 may send a command to the building controller of the associated building to operate the building equipment in a comfort mode when all of the users that are associated with a particular building are determined or deemed not to be away from the building (e.g. the building is occupied).

Figure 4:
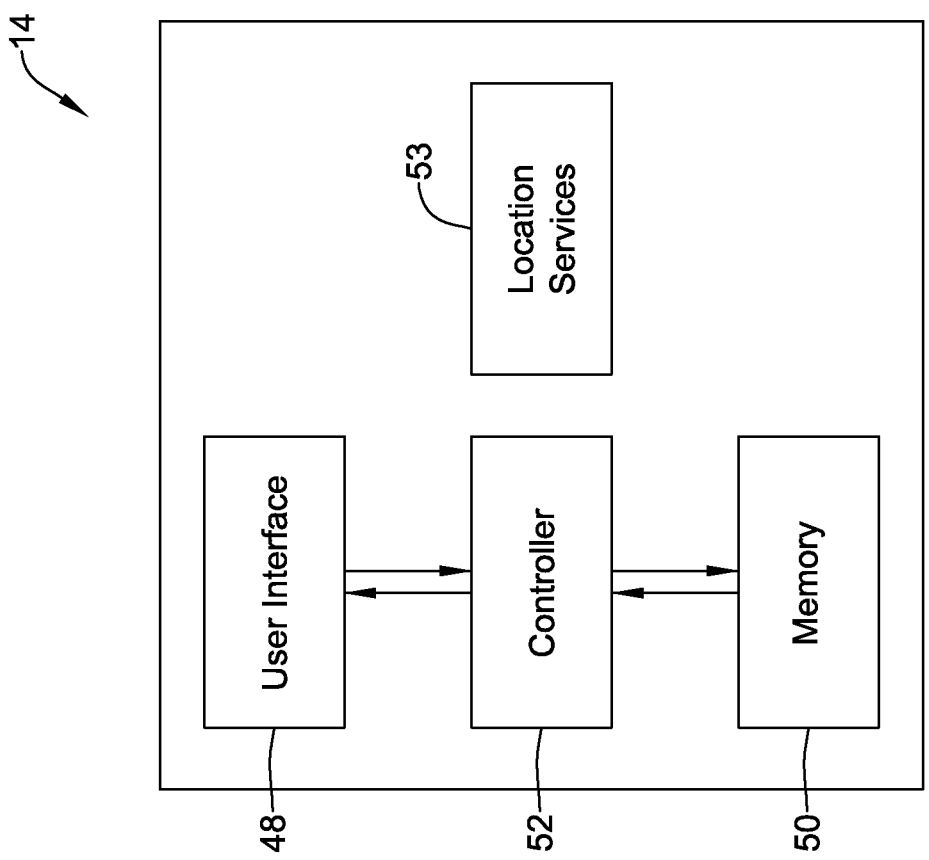
FIG. 4 is a schematic view of an illustrative mobile device.

FIG. 4 is a schematic diagram of the illustrative mobile device 14, as previously referenced in FIGS. 1 and 2. The illustrative mobile device 14 has location services 53 for determining a location of the mobile device 14, and includes a user interface 48, a memory 50 and a controller 52 that is operably coupled to the user interface 48 and to the memory 50. In some cases, the memory 50 may be configured to store an executable program and information pertaining to a geo-fence assigned to a building as well as a geo-fence log for storing one or more mobile device parameters and one or more geo-fence crossing events. In some cases, the controller 52 may be configured to determine the location of the mobile device 14 via the location services 53 and to determine when a geo-fence crossing event has occurred. The controller 52 may be configured to record each of the geo-fence crossing events in the geo-fence log, which is stored in the memory 50. In some cases, the controller 52 may be configured to upload the geo-fence log to a remote server, such as the building automation server 26 (FIGS. 2 and 3) from time to time, upon request, or in response to a detected event. In some cases, the controller 52 may be configured to receive geo-fence diagnostic messages pertaining to potential geo-fencing problems ascertained from the geo-fence log from the remote server 26 and to display the geo-fence diagnostic messages on the user interface 48.

In some cases, the controller 52 may record two or more geo-fence crossings in the geo-fence log before uploading the geo-fence log to a remote server. In some instances, the geo-fence log may include a time stamp for each geo-fence crossing event, although this is not required. In some cases, the geo-fence log may also record whether each geo-fence crossing was an inbound geo-fence crossing event, with the user of the mobile device 14 returning towards home, or an outbound geo-fence crossing event, with the user of the mobile device 14 moving away from home, for example.

The geo-fence log may include any variety of information pertaining to the mobile device 14 itself, such as but not limited to a version of the geo-fence application program running on the mobile device 14, the operating system version running on the mobile device 14, the mobile device telecommunications carrier, the brand, model and version of the mobile device hardware itself, a log of geo-fence application program login events, a log of geo-fence application program logout events, a log of geo-fence application program opening events, a log of geo-fence application program closing events, and an indication of whether location services 53 of the mobile device 14 is enabled. Additional illustrative but non-limiting examples include the operating system type, such as iOS or Android; whether background application refreshing is turned on; whether a geo-fence radius or location coordinates have changed, and/or a new device has been added to the customer account. Further examples of information that may be included in a geo-fence log include whether or not background app-refresh is turned on for the geo-fence application program, or the geo-fence coordinates and radii.

In some cases, the user may need to open the geo-fence application program upon initial startup of the mobile device, or after the geo-fence application program has been closed by the user. Once opened, the user may need to log into the user's account via the geo-fence application program to gain access to the user's building automation system. In some cases, the geo-fence application program may be switched to the background by bringing another application program to the foreground. In some operating systems, the application may still be running when in the background (e.g. background app-refresh is on). This user may be able to move the geo-fence application program between the background and foreground, as desired.

In some cases, for each geo-fence event, the geo-fence log may include, for example, geo-fence event time, location ID, the geo-fence trigger type, the radius of the geo-fence and the geo-fence type. The geo-fence log may include any additional data that may be considered as being useful in diagnosing possible errors or problems with the geo-fencing service. It will be appreciated that the particular data collected in the geo-fence log may change over time, and may for example be dictated and/or controlled by the remote server such as the building automation server 26.

In some cases, the geo-fence log may include a number of parameters, including but not limited to the following:

ClientApplicationType: identifies iOS or Android.
MobileOperatingSystemVersion: operating system version.
MobileDeviceCarrier: carrier that mobile device is running on.
MobileDeviceToken: unique token generated by environment.
AppVersion: version of application.
BackgroundAppRefreshEnabled: true if background app refreshing is turned on.
LocationServicesEnabled: true if location services is turned on.
GeofenceEvents: all geo-fence events sent to cloud since last time this message was sent.
LoginLogoutEvents: all login or logout events since last time this message sent.
OpenCloseEvents: all open or close events since last time this message was sent.
In some cases, for each LoginLogoutEvent, the following geo-fence parameters are logged:
EventTime: time at which event occurs.
Type: 0, user logs out; 1, user logs in.
In some embodiments, for each geoFenceEvent, the following geo-fence parameters are logged:
EventTime: the time at which the event occurred.
LocationID: the location where the geo-fence was crossed.
Trigger: a string describing why the geo-fence event was triggered.
Radius: the size of the geo-fence radius. Type: 0 means user has entered the geo-fence, 1 means user has left the geo-fence.
Each of these may be considered as examples for the Trigger field of each GeoFenceEvent:
FenceCrossed: a normal geo-fence event following a fence crossing.
OpenedFromPoweredOff: geo-fencing application was opened after the phone was off.
OpenedFromForcedClose: geo-fencing application was opened after the application was forced-closed.
NewShortcut: a new geo-fence shortcut was created, such as on the geo-fencing application.
ModifiedShortcut: a geo-fence shortcut was modified, such as on the geo-fencing application.
ObservedShortcutChange: geo-fencing application loaded shortcut changes which may have been created by another user on another geo-fencing application.
GeofenceModified: geo-fencing application modified geo-fence coordinates or radius.
ObservedGeofenceModified: geo-fence application loaded a geo-fence change which may have been caused by another user on another geo-fencing application, for example.
NewLocation: geo-fencing application added a new location.
ObservedNewLocation: geo-fencing application loaded a new location.
LoggedIn: user logged in.
It will be appreciated that these examples are illustrative only.

In some embodiments, the controller 52 of the mobile device 14 may upload the geo-fence log to a remote server, such as the building automation server 26, in accordance with a particular time frame. For example, the geo-fence log may be uploaded if a predetermined period of time has expired since the last upload. In some cases, the predetermined period of time may be a period that is less than 24 hours, 12 hours, 6 hours or less. In some cases, the predetermined period of time may not be a set length of time, but may instead be determined by the length of time for a particular number of geo-fence crossings to occur. For example, the controller 52 may upload the geo-fence log after every two geo-fence crossings, after every three geo-fence crossings, or any number of other geo-fence crossings. In some cases, the controller 52 may upload the geo-fence log in response to a trigger, which may include something done at or on the mobile device 14, and/or a remote event that is communicated to the mobile device 14.

In one example, a trigger may be the detection of a user logging into the geo-fence application program on the mobile device 14 via a physical login, in which the user enters their username and password, or an auto-login in which the application remembers and fills in the user's username and password. Another example trigger may be the detection of a user logging into the geo-fence application program after a forced close of the geo-fence application program, or the detection of a user logging out of the geo-fence application program. In some cases, a geo-fence crossing may function as a trigger. In some instances, the mobile device 14 may receive a request from a remote server, such as the building automation server 26, to upload the geo-fence log. This may be considered an external trigger.

Figure 5:
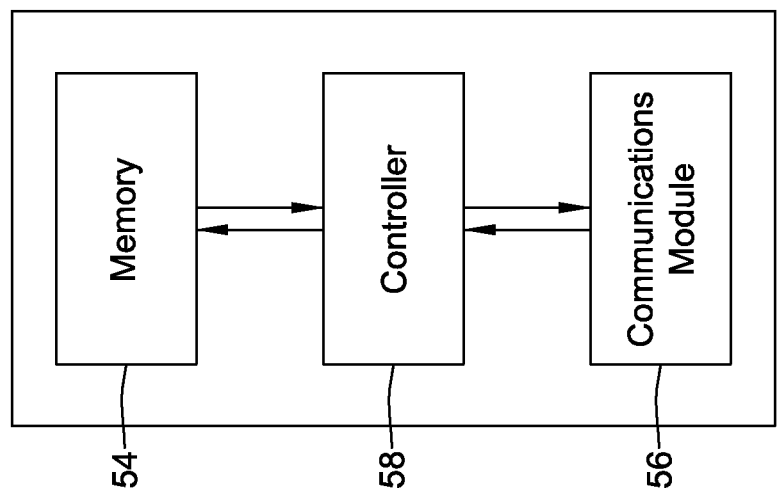
FIG. 5 is a schematic view of an illustrative building automation server.

FIG. 5 is a schematic view of an illustrative building automation server 26, as previously referenced in FIGS. 2 and 3. The building automation server 26 may be configured for servicing a user's building and, in some cases, other buildings as well. The building automation server 26 may include a memory 54, a communications module 56 and a controller 58 that is operably coupled to the memory 54 and to the communications module 56. The memory 54 may be configured for storing a geo-fence that defines a region about the user's building, as well as a log describing mobile device conditions and/or executable program conditions that correspond to geo-fence cross events. The memory may be RAM memory, optical storage, hard disk storage, and/or any other suitable memory.

In some cases, the communications module 56 is configured to communicate with an HVAC controller controlling an HVAC system within the user's building, and the HVAC controller controls the HVAC system at least in part in accordance with information corresponding to geo-fence crossing events. In some cases, an indication of the geo-fence crossing event includes a geo-fence crossing type of inbound or outbound. Sometimes, an indication of the geo-fence crossing event includes a timestamp.

In some cases, the geo-fence log stored in the memory 54 provides a geo-fencing functionality that includes, for example, identifying when the mobile device 14 crosses the geo-fence. The memory 54 may be configured to store a log that includes, for each geo-fence crossing event, an indication of the geo-fence crossing event and one or more parameters that may be associated with the mobile device 14. The memory 54 may be considered as storing the geo-fence log(s) uploaded from one or more mobile devices 14 via the communications module 56. The communications module 56 may be configured to communicate with the user's mobile device 14 and receive the information including the geo fence log describing mobile device conditions and/or executable program conditions that correspond to geo-fence crossing events. The communications module 56 may, for example, be configured to communicate with the mobile device 14 and receive one or more parameters that are associated with the mobile device 14.

In some cases, the one or more parameters that are associated with the mobile device 14 may include one or more of a mobile device type, the brand, model and version of the mobile device hardware itself, a mobile operating system version, one or more programmable operating system settings, a mobile device carrier, an indication of whether the location services of the mobile device 14 is enabled, a current location of the mobile device 14 reported by the location services of the mobile device 14, a connection status of the mobile device 14 to a network, a signal strength indicator, a battery status indicator, a memory usage indicator, a processor usage indicator, and a timestamp.

In some cases, the executable program may be a geo-fence application program running on the mobile device 14 in order to facilitate geo-fencing functionality. In some cases, the one or more parameters that are associated with the mobile device 14 include one or more of a version of the application program, one or more programmable settings of the application program, and one or more errors recorded by the application program. In some cases, the geo-fencing log stored by the memory 54 includes one or more of login events associated with logging into the application program, logout events associated with logging out of the application program, application opening events associated with opening the application program, closing events associated with force closing the application program, foreground events associated with bringing the application program to the foreground, and background events associated with bringing the application program to the background.

In some cases, the log may also include, for each geo-fence cross event, one or more parameters associated with the building automation server 26 itself. For example, the one or more parameters associated with the building automation server 26 may include one or more of a building automation server type, a building automation server operating system version, a connection status of the building automation server 26 with a network, a memory usage indicator, a processor usage indicator, one or more errors recorded by the building automation server 26, a timestamp, a user account associated with the external device, and a number of external devices currently associated with the user account.

In some cases, the controller 58 may be configured to communicate with a building controller located within the building (such as one or more of the building controller 36a, 36b through 36n as shown in FIG. 3), and for each geo-fence crossing event, the log may further include one or more parameters associated with the building controller. For example, the one or more parameters associated with the building controller may include one or more of a building controller type, a building controller operating system version, a building controller application program version, one or more programmable settings of the building controller, a connection status of the a building controller to a network, a signal strength indicator, a battery status indicator, a memory usage indicator, a processor usage indicator, a timestamp, a current state of equipment controlled by the building controller, and one or more sensor readings of the building controller.

In some cases, the mobile device 14 may be configured to store the geo-fence associated with the building and to identify when the mobile device 14 crosses the geo-fence and the communications module 56 may be configured to receive the indications of the geo-fence crossing events from the mobile device 14 and store them in the memory 54. In some cases, the memory 54 may be configured to store a plurality of logs each associated with a corresponding mobile device 14 and the controller 58 may be configured to process the plurality of logs to identify the one or more corrective actions. In some cases, at least two of the plurality of logs relate to different buildings and/or different user accounts.

In some embodiments, the controller 58 may be configured to process the information including the log describing mobile device conditions and executable program conditions that correspond to geo-fence crossing events and to output, via the communications module, diagnostic data pertaining to the processed information. The diagnostic data may be useful in diagnosing geo-fence problems and may help improve geo-fence reliability, accuracy and performance. In some cases, the controller 58 may be configured to identify one or more corrective actions that may be carried out to correct a potential geo-fencing problem.

In some cases, depending on the possible corrective actions determined, emails may be sent out to users of particular applications. For example, certain issues may affect iPhones® (running iOS) but not impact Android™ users while other issues may affect Android users but not impact iOS users. In some cases, it may be determined, for example, that a user has more than one phone set up for geo-fencing on a single account, and they may proactively be notified (e.g. by email, SMS message, etc.) suggesting that this be corrected (e.g. by creating a user account for each phone). If a user does not have geo-fencing set up correctly, such as if they have the wrong number of shortcuts set up, they may be proactively contacted. The system may analyze data in order to measure system performance at different parts of the system. Data may be analyzed to determine how many users have correctly setup geo-fencing and perhaps to look for trends in situations where geo-fencing is not set up correctly. If particular features are especially problematic, the system may determine future development and/or enhancements to the geo-fencing functionality.

In some cases, diagnosing the geo-fencing functionality includes determining if one or more settings of the mobile device 14 are setup correctly. If a determination is made that there is an incorrect setting on the mobile device, the building automation server 26 may send the mobile device 14, via the communications module 56, a message such as a text message, an email or other image or icon suggesting to a user of the mobile device 14 that they manually change the incorrect setting on the mobile device 14 to a correct setting. In some cases, the building automation server 26 may send a communication to the mobile device 14 via the communications module 56 that causes the mobile device 14 and/or the geo-fence application running on the mobile device 14 to automatically correct the incorrect setting on the mobile device 14. In some instances, diagnosing the geo-fence functionality may, for example, include determining if the building automation server 26 is operating correctly.

In some cases, the controller 58 may be configured to process information contained within the log and to output at least some of the processed information via the communications module 56. In some cases, the controller 58 may be configured to output the processed information in graphical or tabular form for display on a display. FIGS. 6-9 provide illustrative but non-limiting examples of the how processed log information may be displayed. In some cases, the processed log information may be displayed on a computer monitor operably coupled to the building automation server 26, for example, or printed on a similarly connected printer.

Figure 6:
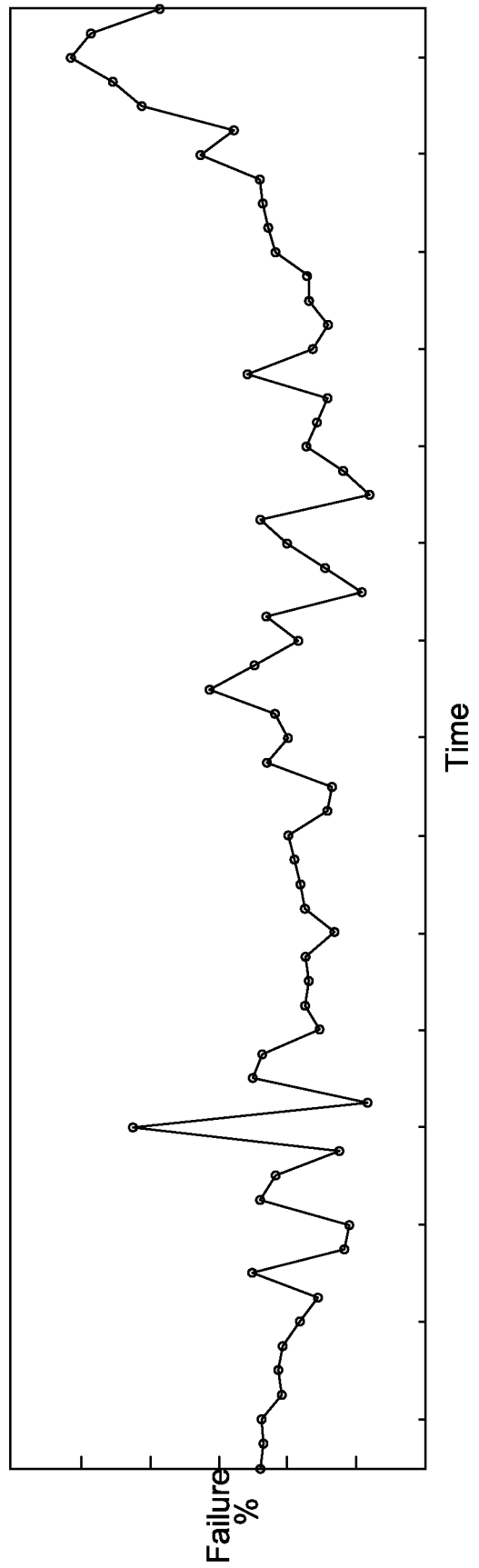

FIG. 6 graphically represents, over time, a percentage of communication failures between individual mobile devices (such as smartphones) and a building automation server identified by the nickname Server1. If the communication failures are particularly high at the same time geo-fence errors are detected and logged by the mobile devices, the source of the geo-fence errors may be attributed to the communication failures. FIG. 7 provides some statistical information in tabular form, including total number of users serviced by the building automation server during a two week time period, the number of different locations, the percent of registered thermostats that were offline, the percent of locations with improper geo-fence shortcuts, the percent of locations with the HVAC controller in the hold mode (and thus Geo-fencing is inactive), the percent of users that have multiple geo-fence phones assigned to the same user (which in some cases is not allowed), the percent of errors for communications between iOS phones and the building automation server, and the percent of errors for communications between Android phones and the building automation server. As can be seen, in this example, the displayed data are derived from logs obtained from many mobile devices across many user accounts, and can help identify and/or diagnose sources of geo-fence problems on a global basis. In some cases, the information that is displayed may be tailored to a specific mobile device and/or specific user account, as desired.

A shortcut may be programmed into the thermostat that enables a user to quickly and easily, by selecting a single button on the thermostat or their smartphone, instruct the thermostat to carry out one or more instructions. For example, a shortcut labeled Depart Home may include instructions to use Away settings when the thermostat is informed. A shortcut labeled Sleep may include instructions regarding a particular temperature set point, for example. A geo-fencing shortcut may, for example, include information pertaining to a geo-fence radius.

FIG. 8 shows logged parameters associated with a single location labeled "Home" for several crossing events. In the example shown, several thermostat parameters are displayed for each crossing event including the thermostat name, mac address, online status, firmware version, power source, and whether the thermostat is in the "hold" mode. Also displayed are parameters associated with the mobile device(s) for each crossing event including the phone operating system type (iOS or Android), the geo-fence application version, a log of the geo-fence event times, and whether a user has multiple geo-fence phones assigned to the same user (which in some cases is not allowed). These are just some example parameters that may be displayed.

FIG. 9 shows logged parameters associated with several crossing events of a single location. In the example shown, several parameters are shown for each crossing event including an email address of the user, a trigger event, a phone token or ID, a phone time stamp, a phone direction relative to the geo-fence, a timestamp produced by the building automation server (e.g. Server1) indicating when the fence crossing was processed by the building automation server, a timestamp produced by the building automation server (e.g. Server1) indicating when the fence crossing was received by the building automation server, a communication status between the building automation server (e.g. Server1) and a second server (e.g. Server2) that is configured to communicate with the HVAC Controller of the building, and a communication status between the second server (e.g. Server2) and the HVAC Controller of the building. These are just some example parameters that may be displayed.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A building automation server that is configured as part of a building automation system for servicing a building, the building automation server comprising:

a memory configured to store a log of a plurality of geo-fence crossing events identified over time, the log includes an entry for each respective geo-fence crossing event of the plurality of geo-fence crossing events, wherein each entry of the plurality of geo-fence crossing events identifies when a mobile device crosses a geo-fence associated with the building and includes an indication of the respective geo-fence crossing event and one or more parameters of the mobile device that were present at a time of the respective geo-fence crossing event, where the one or more parameters of the mobile device include one or more of a mobile device type, a mobile operating system version, one or more programmable operating system settings, a mobile device carrier, an indication of whether the location services of the mobile device is enabled, a current location of the mobile device reported by the location services of the mobile device, a connection status of the mobile device to a network, and a signal strength indicator, wherein the mobile device executes an application program that facilitates a geo-fencing functionality and that controls an HVAC system, and wherein the log further comprises application opening events associated with opening the application program and closing events associated with closing the application program;

a communications module configured to communicate with the mobile device and to receive the one or more parameters of the mobile device;

a controller operably coupled to the memory and the communications module, the controller configured to process the log to diagnose the geo-fencing functionality to improve geo-fence accuracy in identifying when the mobile device crosses the geo- fence, including determining whether the geo-fencing functionality is working properly and to identify one or more corrective actions that improve the geo-fence accuracy when the geo-fencing functionality is determined to not be working properly;

the controller further configured to provide the one or more corrective actions to the communications module for output to the mobile device when the geo-fencing functionality is determined to not be working properly;

the communications module configured to communicate a message for display by the mobile device, the message indicating that geo-fencing functionality is not functioning properly, the message including the one or more corrective actions and instructing a user of the mobile device to take the one or more corrective actions via the mobile device to cause the geo-fencing functionality to be restored and working properly; and the controller further configure to operate the building automation system with the geo-fencing functionality restored and working properly.

2. The building automation server of claim 1, wherein the mobile device executes an application program that facilitates the geo fencing functionality, the one or more parameters of the mobile device further comprises comprising one or more of a version of the application program, one or more programmable settings of the application program, and one or more errors recorded by the application program.

3. The building automation server of claim 1, wherein the log further comprises one or more of the following: login events associated with logging into the application program; logout events associated with logging out of the application program; foreground events associated with bringing the application program to the foreground; and background events associated with bringing the application program to the background.

4. The building automation server of claim 1, wherein, for each entry in the log, the log further includes one or more parameters associated with the building automation server.

5. The building automation server of claim 4, wherein the one or more parameters associated with the building automation server comprises one or more of a building automation server type, a building automation server operating system version, a connection status of the building automation server with a network, a memory usage indicator, a processor usage indicator, one or more errors recorded by the building automation server, a timestamp, a user account associated with the external device, a number of external devices currently associated with the user account.

6. The building automation server of claim 1, wherein the controller is further configured to communicate with a building controller located in the building, wherein for each entry in the log, the log further comprises one or more parameters associated with the building controller.

7. The building automation server of claim 6, wherein the one or more parameters associated with the building controller comprises one or more of a building controller type, a building controller operating system version, a building controller application program version, one or more programmable settings of the building controller, a connection status of the a building controller to a network, a signal strength indicator, a battery status indicator, a memory usage indicator, a processor usage indicator, a timestamp, a current state of equipment controlled by the building controller, and one or more sensor readings of the building controller.

8. The building automation server of claim 1, wherein each entry of the plurality of geo-fence crossing events identifies a geo-fence crossing type that indicates an inbound crossing type or an outbound crossing type.

9. The building automation server of claim 1, wherein each entry of the plurality of geo-fence crossing events comprises.

10. The building automation server of claim 1, wherein the mobile device is configured to store the geo-fence associated with the building and to identify when the mobile device crosses the geo-fence, and wherein the communications module of the building automation server is configured to receive the log from the mobile device and store the log in the memory.

11. The building automation server of claim 1, wherein the memory is configured to store a plurality of logs each associated with a corresponding mobile device, and wherein the controller is configured to process the plurality of logs to identify the one or more corrective actions.

12. The building automation server of claim 11, wherein at least two of the plurality of logs relate to different user accounts.

13. The building automation server of claim 1, wherein diagnosing the geo-fencing functionality comprises determining if one or more settings of the mobile device are setup correctly.

14. The building automation server of claim 1, wherein diagnosing the geo-fencing functionality comprises determining if the building automation server is operating correctly.

15. The building automation server of claim 1, wherein the communications module communicates to the mobile device a message to be viewable on the mobile device that explains the one or more corrective actions to be taken by the user.

16. A building automation server servicing a plurality of buildings, each of the plurality of buildings including an HVAC system in a respective building of the plurality of buildings, each mobile device of a plurality of mobile devices comprising an executable program for controlling the HVAC system in at least one of the plurality of buildings, the building automation server comprising:

a memory for storing a geo-fence that defines a region about each of the plurality of buildings;

the memory configured to store information including a log for the plurality of buildings, the log including a plurality of entries each identifying a geo-fence crossing event and describing mobile device conditions that correspond to the corresponding geo-fence crossing event, wherein the log includes an entry for each respective geo- fence crossing event of a plurality of geo-fence crossing events, wherein each entry of the plurality of geo-fence crossing events identifies when a particular mobile device of the plurality of mobile devices crosses a particular geo-fence about a building of the plurality of buildings and includes an indication of the respective geo-fence crossing event and one or more mobile device conditions of the particular mobile device that were present at a time of the respective geo-fence crossing event, and wherein the log further comprises application opening events associated with opening the executable program and closing events associated with closing the executable program;

a communications module configured to communicate with each of the plurality of mobile devices and receive the information stored in the memory including the plurality entries in the log;

the communications module further configured to communicate with an HVAC controller controlling the HVAC system in each of the plurality of buildings;

a controller operably coupled to the memory and the communications module, the controller configured to process the information in the log from the plurality of mobile devices to determine whether the plurality of geo-fence crossing events for the particular mobile device are likely to be properly identified or not to improve geo-fence accuracy in identifying when each of the plurality of mobile devices crosses the geo-fence; and the controller further configured to output at least some of the processed information that corresponds to the plurality of geo-fence crossing events to each of the HVAC controllers via the communications module, and in response, each of the HVAC controllers controls the HVAC system in a corresponding one of the plurality of buildings based at least in part on the processed information.

17. The building automation server of claim 16, wherein the controller is configured to output at least some of the processed information in graphical or tabular form for display on a display.

* * * * *

UNITED STATES PATENT AND TRADEMARK OFFICE
CERTIFICATE OF CORRECTION

PATENT NO. : 10,802,469 B2
APPLICATION NO. : 14/933948
DATED : October 13, 2020
INVENTOR(S) : Jonathan Frenz and Kevin L. Weirich Page 1 of 1

It is certified that error appears in the above-identified patent and that said Letters Patent is hereby corrected as shown below:

In the Claims

Column 12, Line 65-67 (Claim 2): Remove "the mobile device executes an application program that facilitatesthe geo fencing functionality"

Column 13, Line 1 (Claim 2): Remove "comprising"

Column 13, Line 48 (Claim 9): After "...events comprises" add --a timestamp.--

Signed and Sealed this
Tenth Day of August, 2021

Drew Hirshfeld
*Performing the Functions and Duties of the
Under Secretary of Commerce for Intellectual Property and
Director of the United States Patent and Trademark Office*